March 10, 1931.   F. R. GRADY   1,795,487
EXPANDING APPARATUS
Filed Dec. 15, 1928   2 Sheets-Sheet 2
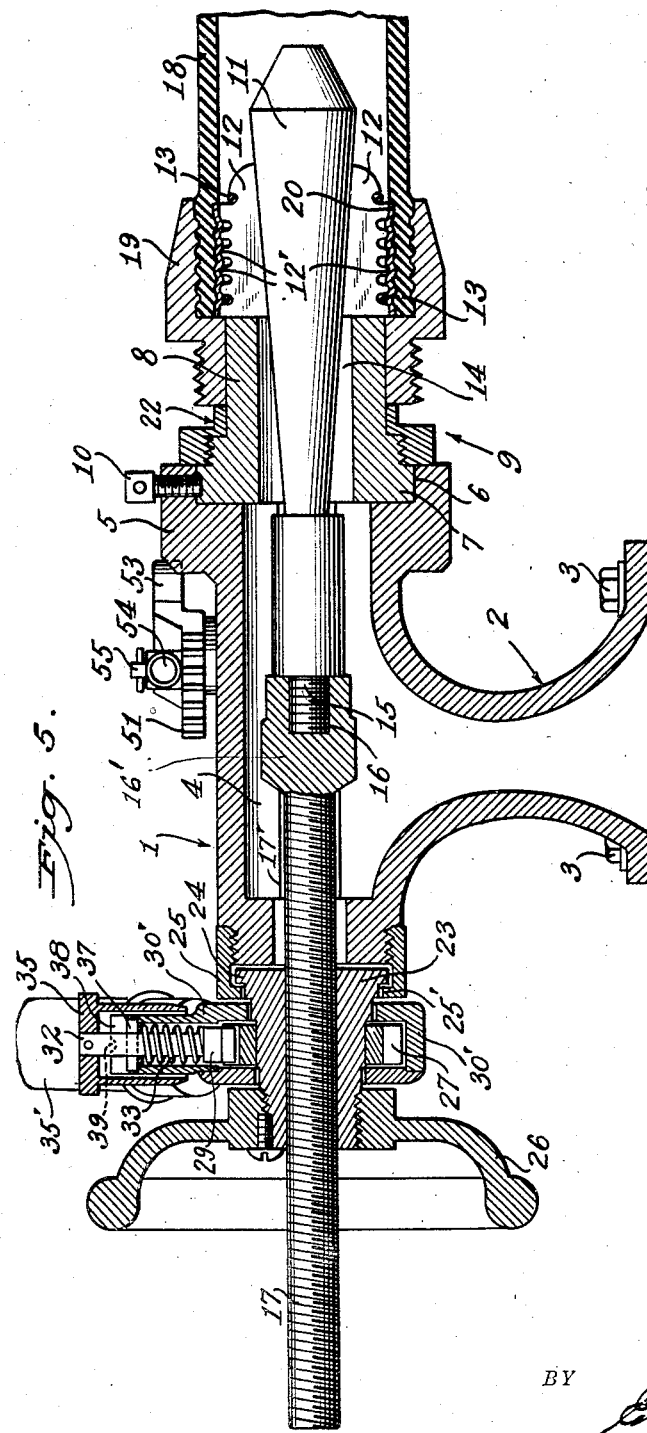
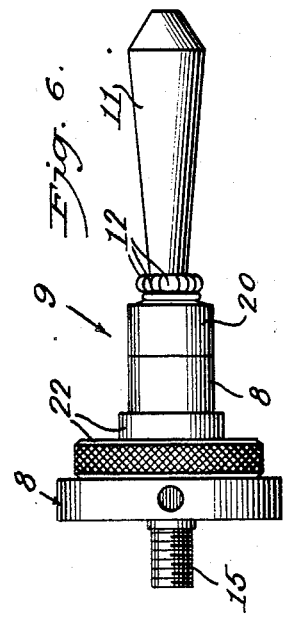
INVENTOR
Frank R. Grady
BY
ATTORNEY Patented Mar. 10, 1931

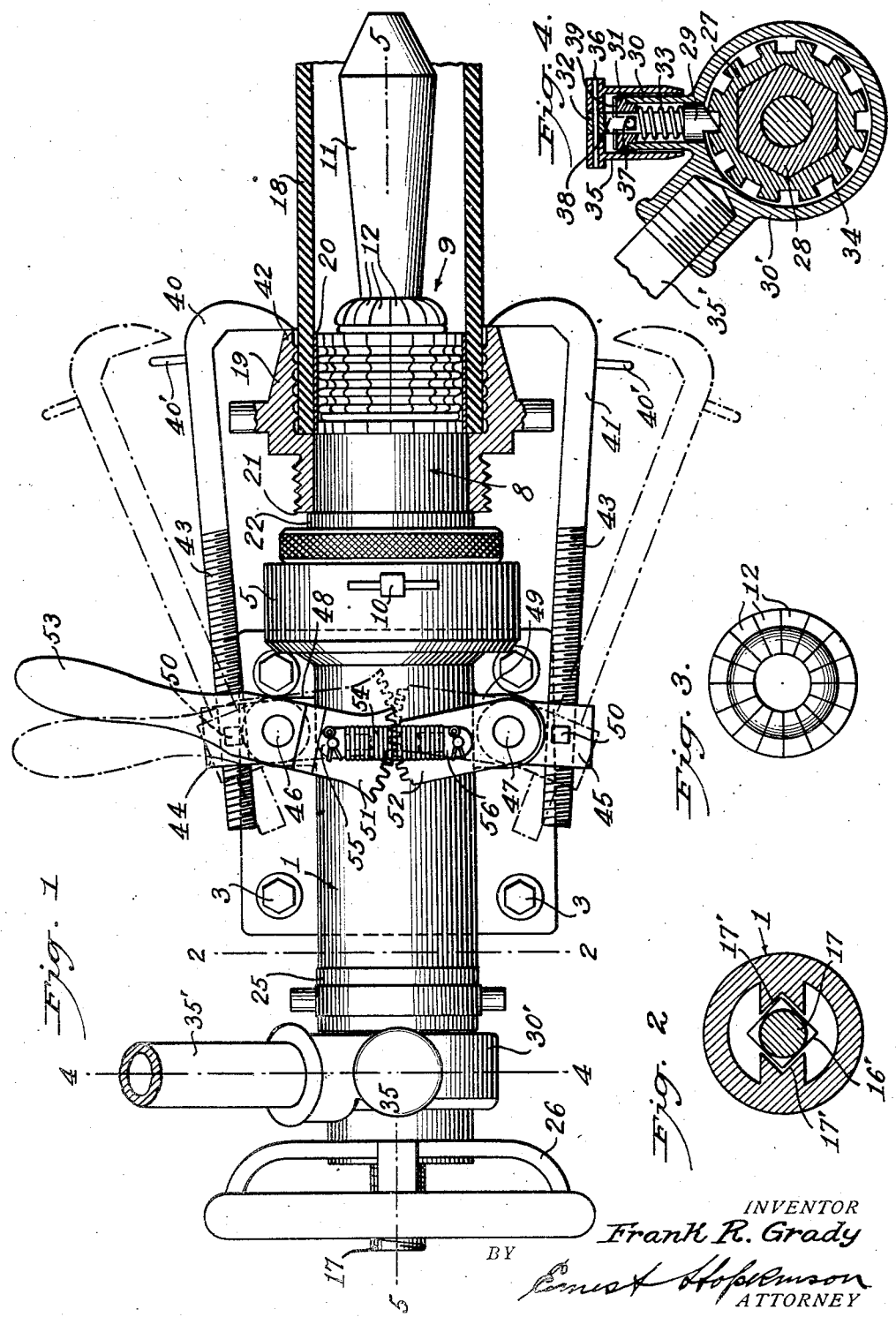

1,795,487

UNITED STATES PATENT OFFICE

FRANK R. GRADY, OF JERSEY CITY, NEW JERSEY, ASSIGNOR TO EUREKA FIRE HOSE MANUFACTURE COMPANY, OF JERSEY CITY, NEW JERSEY, A CORPORATION OF NEW JERSEY

EXPANDING APPARATUS

Application filed December 15, 1928. Serial No. 326,244.

This invention relates to apparatus for expanding a metal ring within a tubular member to attach the same permanently to a coupling member, such as in hose coupling.

One object of the invention is to provide a series of size-differing expanding units any one of which may be selected and attached to a body portion of the machine, which latter includes means for operating the expanding unit selected. By this means it is necessary to have only one machine for handling a large variety of different size couplings.

Another object is to provide a device of the foregoing character involving simplicity in construction and in which the coupling units may be easily and quickly interchanged to accommodate the different sizes of pipe and coupling to be connected.

Another object is to provide simple and efficient means for holding the coupling rigidly during the coupling operation and the subsequent release of the expanding mechanism after the coupling has been completed.

Another object is to provide hand-operated means, preferably including a hand wheel and a reversible ratchet mechanism, which are operable independently or simultaneously to actuate the expanding mechanism.

Other objects and advantages will appear as the description proceeds.

In the accompanying drawings—

Figure 1 is a plan view of the expanding apparatus with parts shown in section;

Fig. 2 is a cross-section on the line 2—2 of Fig. 1;

Fig. 3 is an end view of a series of radially disposed expansion segments;

Fig. 4 is a cross-section on the line 4—4 of Fig. 1;

Fig. 5 is a longitudinal section on the line 5—5 of Fig. 1; and

Fig. 6 is a view of one of the demountable expanding units.

Referring to the drawing, which represents one practical embodiment of the invention, reference character 1 indicates generally a body portion having a pedestal 2 whereby the body may be attached to any suitable platform, such as by bolts 3. The body 1 has a longitudinal bore indicated at 4, one end of which terminates in a head 5 preferably having a socket 6 adapted to receive the shoulder 7 (see Fig. 5) of an abutment member 8 forming a portion of an expanding unit indicated generally by the reference numeral 9, a set-screw 10 being provided in the head 5 for holding the abutment member 8 solidly to the body 1. The unit 9 also includes a tapered mandrel 11 around which there is disposed in radial relation a series of expanding segments 12 which are yieldingly held against the mandrel 11 by any suitable means, such as rubber bands or springs 13. The mandrel 11 extends through a bore 14 of the abutment member 8 and terminates in a threaded stem 15, which is received in a threaded socket 16 of a threaded shank 17 extending longitudinally into the bore 4 of the body 1 from the opposite end thereof. A portion of the shank 17 is preferably squared, as indicated at 16' in Fig. 2 and runs in longitudinal guides 17' within the bore 4.

In the operation of joining a hose, as indicated at 18, to a coupling member 19, a metallic sleeve or ferrule 20 is placed upon the expanding segments 12, as in Fig. 1, and the coupling member 19 is then positioned with its inner end 21 against a stop 22 which is preferably in the form of a collar threaded on to the abutment member 8 so that the stop may be readily adjusted for couplings of different lengths. With the coupling unit 9 thus held in position within the head 5 of the body 1, and the tapered mandrel 11 connected to the threaded member 17, as indicated in Fig. 5, motion is imparted lengthwise of the member 17 to draw the tapered mandrel through the segments 12 whereby the increasing diameter of the mandrel spreads the segments apart and expands the sleeve 20 into the tubular member 18 and secures it to the coupling member 19. The segments 12 are provided preferably with rounded teeth, as indicated at 12', whereby the sleeve is both expanded and corrugated within the hose 18. In some cases a washer of suitable material, such as rubber composition, is interposed between the end of the tubular member 18 and the coupling member 19.

For imparting longitudinal motion to the threaded member 17, there is preferably mounted at the end of the body 1 opposite the head 5, a rotatable element 23 having a circular shoulder 24 by means of which it is rotatably connected by a threaded element 25 to the opposite end of the body 1, the element 25 having a cooperating shoulder 25', clearly illustrated in Fig. 5. A hand-wheel 26 is fixedly connected to the rotatable element 23.

There is also provided a ratchet lever for rotating the element 23 to impart motion to the threaded rod 17. This last-named mechanism includes a reversible ratchet wheel 27 which is secured preferably to a hexagon portion 28 of the member 23, and a spring-impelled tooth 29 is mounted in a guide 30 having a head 31 through which a vertical stem 32 secured to the tooth 29 extends. A compression spring 33 holds the tooth 29 normally in engagement with the teeth 34 of the ratchet wheel 27. A cap 35 is connected to the stem 32 as by a cross-pin 36. The stem 32 also has a pin 37 which normally rides in a slot 38 of the head 31 when the tooth 29 is in engagement with the ratchet teeth 34. It will be seen by this ratchet mechanism that the tooth 29 may be rotated 180° in either direction to operatively engage the ratchet wheel 27 to effect advance or reverse rotation thereof. The ratchet tooth 29 can also be moved to neutral position by raising the stem 32 by means of the cap 35 upward against the compression spring 33 and rotating the stem through an angle of 90°, thereby permitting the pin 37 to rest in a groove 39 in the top of the head 31. A lever 35' is detachably connected to a housing 30' enclosing the ratchet wheel 27 and upon which the guide 30 is carried. The hand-wheel 26 and the ratchet actuating lever 35' are therefore operable simultaneously or independently, and require but little space for their operation. Other forms of ratchet mechanism may be used. The one described herein exemplifies a type which has been found satisfactory.

In order to hold the coupling 19 during the expanding operation and subsequent release of the tapered mandrel 11 from expanding position, a pair of hooked arms respectively 40 and 41 are adapted to engage the end 42 of the coupling member 19. These hooked arms are preferably threaded, as indicated at 43, into blocks respectively 44 and 45 pivotally mounted at 46 and 47 in lugs 48 and 49 carried by the body 1. Set-screws 50 clamp the threaded arms 40 and 41 in adjusted portion. It is obvious that the threaded portions of the arms 40 and 41 may be flattened where they are engaged by the set-screws 50, or squared and held by any suitable fastening means. For operating the arms 40 and 41, a hand-actuated gear segment 51 is operatively secured to the block 44 and is in mesh with a similar gear segment 52 operatively connected to the block 45, so that by moving the handle 53 of the segment 51, the arms 40 and 41 may be swung to and away from their effective positions. A compression spring 54 is interposed between a pair of oppositely disposed pins 55 and 56 swingably connected respectively to the gear segments 51 and 52, whereby the hooked levers yieldingly retain either of the two positions indicated in Fig. 1. The hooked arms 40 and 41 may be provided with pins 40', whereby to prevent slippage of a cord or chain passed around the arms to hold them more firmly in effective position, for instance, when releasing the mandrel 11 from the segments 12.

In Fig. 6 there is illustrated an expanding unit which is interchangeable with the unit already described. The two interchangeable units designated 9 are generally representative of any number of similar units of properly varied dimensions and with which the apparatus may be equipped to handle couplings of different styles and sizes. For example, the apparatus may be equipped with a set of units adapted to handle all sizes of coupling from ¾" to 2½" inclusive, and size changes are made by simply changing the units.

It is to be noted that each of the expanding units may include the abutment member 8, a detachable stop member 22, a tapered mandrel 11 having a threaded end 15, and a series of expanding segments 12 of the proper diameter to handle the expandible ring 20 for the particular hose and coupling with which the unit is to be used; and it will be observed that it is necessary only to release the set-screw 10 and unscrew the mandrel 11 in order to remove the whole unit 9 for the substitution of any other one of the series of units which it is necessary to use for the work in hand.

With the foregoing description, it is evident that various alterations and modifications may suggest themselves to those skilled in the art without departing from the spirit of the invention, and it is therefore not intended to limit the invention except as defined in the appended claims.

Having thus described my invention, what I claim and desire to protect by Letters Patent is:

1. An apparatus for expanding a metallic ring within a tubual member to attach the same permanently to a coupling member, comprising a body, and an expanding unit detachably connected to said body, said unit including a stop for predetermining the position of said coupling member, in combination with means associated with said body and detachably connectable to the attached unit for actuating the same, whereby other similar units of varying sizes may be connected to said body and said actuating means.

2. An apparatus for expanding a metallic ring within a tubular member to attach the same permanently to a coupling member, comprising a body, and an expanding unit detachably connected to the body, whereby other similar units of varying sizes may be substituted therefor, said unit including adjustable means for predetermining the position of the coupling member, in combination with means associated with said body adapted to actuate the attached unit, said last named means including a hand wheel and ratchet mechanism, the latter having an operating lever, said hand wheel and the lever being operable simultaneously or independently.

3. An apparatus for expanding a metallic ring within a tubular member to attach the same permanently to a coupling member, including an expanding unit, means for actuating the unit, and releasable means adapted to hold said coupling member.

4. An apparatus for expanding a metallic ring within a tubular member to attach the same permanently to a coupling member, comprising a body, an expanding unit detachably connected to said body, whereby another similar unit of a different size may be substituted therefor, said unit carrying an adjustable stop for determining the position of the coupling member, in combination with means for operating the attached unit, and releasable means for holding said coupling member during operation of said unit.

5. An apparatus for expanding a metallic ring within a tubular member to attach the same permanently to a coupling member, comprising a body, an expanding unit detachably connected to said body, said unit comprising a tapered mandrel, a series of expandible segments disposed radially on said mandrel and operable thereby to expand the ring or to release said segments from expanding position, an abutment for one end of said series of segments and stationary with respect to said body, and a stop for predetermining the position of said coupling member, in combination with means associated with said body and detachably connectable to said mandrel for operating the same, whereby other similar units of varying sizes may be connected to the body and said operating means.

6. An apparatus for expanding a metallic ring within a tubular member to attach the same permanently to a coupling member, comprising a body, an expanding unit detachably connected to said body, said unit comprising a tapered mandrel, a series of expandible segments disposed radially on said mandrel and operable thereby to expand the ring or to release said segments from expanding position, an abutment for one end of said series of segments and stationary with respect to said body, an adjustable stop adapted to predetermine the position of said coupling member, in combination with means associated with said body and detachably connected to said mandrel for operating the same, and releasable means for holding said coupling member stationary with respect to said body, whereby other similar units of varying sizes may be connected to said body and said operating means.

7. An apparatus for expanding a metallic ring within a tubular member to attach the same permanently to a coupling member, comprising a body, an expanding unit detachably connected to said body, said unit comprising a tapered mandrel, a series of expandible segments disposed radially on said mandrel and operated by movement of said mandrel, an abutment adapted to prevent bodily movement of said series of segments when the mandrel is moved to expand the segments within said ring, and a stop adjustably carried by said abutment member adapted to predetermine the position of said coupling member, in combination with a threaded member detachably connectable to said mandrel, an element threaded on to said threaded member, a hand wheel and ratchet mechanism each operable to rotate said threaded element whereby to impart lengthwise motion to said threaded member, and releasable devices adapted to engage said coupling member to hold the same stationary with respect to said abutment, whereby other similar units may be likewise connected to said body and said threaded member for operation by the hand wheel or the ratchet mechanism.

8. An apparatus for expanding a metallic ring within a tubular member to attach the same permanently to a coupling member, comprising a body, an expanding unit detachably connected to said body, said unit comprising a tapered mandrel adapted to be moved in the direction of its axis, a series of expandible segments disposed radially on said mandrel and operable thereby to expand the ring or to release said segments from expanding position, an abutment for one end of said series of segments and stationary with respect to said body, and an adjustable stop associated with said abutment and adapted to predetermine the position of said coupling member, in combination with means associated with said body and detachably connected to the mandrel for imparting motion thereto in the direction of its axis, and a plurality of holding means releasably engaging the outer end of the coupling member to prevent movement thereof with respect to said body, said holding means being adjustable to different sizes of coupling members and operable simultaneously to engage or release said coupling member, whereby other similar units of varying sizes may be connected to the body and the mandrel moving means.

9. An apparatus for expanding a metallic ring within a tubular member to attach the same permanently to a coupling member, comprising a body, an expanding unit detachably connected to said body, whereby other similar units of different sizes may be likewise connected to the body, said unit comprising a tapered mandrel, a series of expansible segments disposed radially on said mandrel and operable thereby to expand the ring or to release said segments from expanding position, an abutment for one end of said series of segments and stationary with respect to said body, and a stop for predetermining the position of said coupling member, in combination with means associated with said body and detachably connectable to said mandrel for operating the same, said last named means consisting of a threaded bar, an element in threaded engagement with said bar, a hand wheel connected to said element for rotating the same, and ratchet mechanism including a lever for also imparting rotation to said threaded element, said ratchet mechanism being reversible and including a neutral position whereby said hand wheel and said ratchet mechanism may be operated simultaneously or independently of each other.

10. An apparatus for expanding a metallic ring within a tubular member to attach the same permanently to a coupling member, comprising a body, an expanding unit detachably connected to said body, whereby other similar units of different sizes may be likewise connected to the body, said unit comprising a tapered mandrel, a series of expensible segments disposed radially on said mandrel and operable thereby to expand the ring or to release said segments from expanding position, an abutment for one end of said series of segments and stationary with respect to said body, and an adjustable stop for predetermining the position of said coupling member, in combination with means associated with said body and detachably connectable to said mandrel for operating the same, said last named means consisting of a threaded shank including a squared end having a threaded socket, said tapered mandrel being threaded into said socket, guides carried by said body adapted to cooperate with said squared end to prevent rotation of said threaded shank, an element in threaded engagement with said shank, and means for rotating said element, whereby to impart lengthwise motion to said mandrel.

Signed at Jersey City, county of Hudson, State of New Jersey, this 10th day of December, 1928.

FRANK R. GRADY.